(12) United States Patent
Kim et al.

(10) Patent No.: US 12,369,645 B2
(45) Date of Patent: Jul. 29, 2025

(54) ERROR ANALYSIS DEVICE FOR AEROSOL GENERATING DEVICE AND SYSTEM FOR THE SAME

(71) Applicant: KT&G CORPORATION, Daejeon (KR)

(72) Inventors: Yong Hwan Kim, Gyeonggi-do (KR); Sung Wook Yoon, Gyeonggi-do (KR); Seung Won Lee, Gyeonggi-do (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 927 days.

(21) Appl. No.: 17/267,570

(22) PCT Filed: Dec. 10, 2020

(86) PCT No.: PCT/KR2020/018032
§ 371 (c)(1),
(2) Date: Feb. 10, 2021

(87) PCT Pub. No.: WO2021/172715
PCT Pub. Date: Sep. 2, 2021

(65) Prior Publication Data
US 2022/0408836 A1     Dec. 29, 2022

(30) Foreign Application Priority Data
Feb. 26, 2020     (KR) .......................... 10-2020-0023922

(51) Int. Cl.
*A24F 40/53*     (2020.01)
*A24F 40/40*     (2020.01)
(Continued)

(52) U.S. Cl.
CPC .............. *A24F 40/53* (2020.01); *A24F 40/40* (2020.01); *A24F 40/60* (2020.01); *A24F 40/65* (2020.01); *G06F 17/40* (2013.01)

(58) Field of Classification Search
CPC .......... A24F 40/53; A24F 40/40; A24F 40/60; A24F 40/65; G06F 17/40; G06F 11/3476
See application file for complete search history.

(56) References Cited

U.S. PATENT DOCUMENTS 6,820,220 B1 * 11/2004 Dominke ........... G05B 19/0428
713/340
6,834,363 B2    12/2004 Austen et al.
(Continued)

FOREIGN PATENT DOCUMENTS

CN     108011752 A     5/2018
JP       7319779 A    12/1995
(Continued)

OTHER PUBLICATIONS

Office Action issued May 27, 2021 in Korean Application No. 10-2020-0023922.
(Continued)

*Primary Examiner* — Eman A Alkafawi
*Assistant Examiner* — Dilara Sultana
(74) *Attorney, Agent, or Firm* — Sughrue Mion, PLLC

(57) ABSTRACT

An error analysis device for an aerosol generating device includes: a communication interface configured to receive log data from the aerosol generating device; and a processor configured to determine at least one error that occurred in the aerosol generating device based on the log data that is received. The log data according to an embodiment may include logs corresponding to events that occurred in the aerosol generating device.

9 Claims, 9 Drawing Sheets

(51) Int. Cl.
*A24F 40/60* (2020.01)
*A24F 40/65* (2020.01)
*G06F 17/40* (2006.01)

(56) References Cited

U.S. PATENT DOCUMENTS

| | | | |
|---|---|---|---|
| 2013/0317879 | A1 | 11/2013 | Ukai et al. |
| 2013/0340775 | A1 | 12/2013 | Juster et al. |
| 2015/0323590 | A1* | 11/2015 | Xu ................... G01R 31/2886 324/762.02 |
| 2015/0327596 | A1* | 11/2015 | Alarcon ................ H04L 67/535 131/328 |
| 2016/0211693 | A1 | 7/2016 | Stevens et al. |
| 2016/0371132 | A1 | 12/2016 | Prabhakara |
| 2017/0027234 | A1 | 2/2017 | Farine et al. |
| 2017/0045566 | A1* | 2/2017 | Neudecker ........... G01R 31/007 |
| 2017/0304563 | A1* | 10/2017 | Adelson .............. A61M 15/003 |
| 2018/0043114 | A1 | 2/2018 | Bowen et al. |
| 2018/0132529 | A1* | 5/2018 | Sur ....................... H05B 1/0244 |
| 2019/0158938 | A1 | 5/2019 | Bowen et al. |
| 2019/0387795 | A1* | 12/2019 | Fisher ..................... A24F 40/53 |
| 2020/0000143 | A1* | 1/2020 | Anderson ............... G06F 18/22 |
| 2020/0060347 | A1* | 2/2020 | Kersey ................... H04W 4/80 |
| 2021/0235768 | A1 | 8/2021 | Akao et al. |

FOREIGN PATENT DOCUMENTS

| | | | | |
|---|---|---|---|---|
| JP | 8-336011 | A | 12/1996 | |
| JP | 2002-342178 | A | 11/2002 | |
| JP | 2013-246529 | A | 12/2013 | |
| JP | 6636117 | B1 | 1/2020 | |
| KR | 10-2016-0009678 | A | 1/2016 | |
| KR | 10-2016-0147256 | A | 12/2016 | |
| KR | 10-2019-0011264 | A | 2/2019 | |
| KR | 10-2019-0131114 | A | 11/2019 | |
| WO | 2015165747 | A1 | 11/2015 | |
| WO | 2017205692 | A1 | 11/2017 | |
| WO | WO-2019104227 | A1 * | 5/2019 | ............. A24B 15/16 |
| WO | 2019162160 | A1 | 8/2019 | |

OTHER PUBLICATIONS

Notice of Reasons for Refusal dated May 31, 2022 from the Japanese Patent Office in Japanese Application No. 2021-518724.
International Search Report dated Mar. 16, 2021, in International Application No. PCT/KR2020018032.
Extended European Search Report dated Oct. 28, 2021 in Application No. 20851274.9.
Office Action issued May 5, 2023 in Chinese Application No. 202080005695.6.

* cited by examiner

FIG. 7

```
<Log Data>
19.08.07 14:21:32  Heating Start
19.08.07 14:21:33  -Er: Device Hot          ← 710
19.08.07 14:22:12  Ready
19.08.07 14:25:42  User Off
19.08.07 14:25:49  Sleep
19.08.07 14:58:33  Wake Up
19.08.07 14:58:38  Heating Start
19.08.07 14:59:18  Ready
19.08.07 15:03:14  -Er: Heater Overheat     ← 710
19.08.07 15:03:48  Smoke Finish
19.08.07 15:46:11  -Er: Quiescent Current   ← 710
19.08.07 17:08:11  Heating Start
19.08.07 17:08:12  -Er: Device Hot          ← 710
19.08.07 17:21:35  Charging Start
19.08.07 17:21:42  Sleep
19.08.07 18:40:02  Charging Finish
19.08.07 19:57:19  Wake Up
19.08.07 19:59:11  Sleep
19.08.07 21:20:03  Wake Up
19.08.07 21:20:06  Heating Start
19.08.07 21:20:41  -Er: Heater Overcurrent  ← 710
19.08.07 21:20:46  Ready
19.08.07 21:25:16  Smoke Finish
19.08.07 21:25:21  Heating Start
19.08.07 21:26:01  Ready
19.08.07 21:30:31  Smoke Finish
19.08.07 21:30:37  Heating Start
19.08.07 21:30:38  -Er: Device Hot          ← 710
```

ERROR ANALYSIS SYSTEM — 1200

AEROSOL GENERATING DEVICE — 100
- MEMORY — 910
- COMMUNICATION INTERFACE — 1210
- PROCESSOR — 120

LOG DATA → ERROR ANALYSIS DEVICE — 500

ERROR ANALYSIS DEVICE FOR AEROSOL GENERATING DEVICE AND SYSTEM FOR THE SAME

CROSS REFERENCE TO RELATED APPLICATIONS

This application is a National Stage of International Application No. PCT/KR2020/018032 filed Dec. 10, 2020, claiming priority based on Korean Patent Application No. 10-2020-0023922 filed Feb. 26, 2020.

TECHNICAL FIELD

Embodiments of the present disclosure relate to a device for analyzing errors of an aerosol generating device, and a system for the same.

BACKGROUND ART

In recent years, there is an increasing demand for a method of overcoming disadvantages of general aerosol generating devices. For example, there is an increasing demand for a method of fixing errors that occur in an aerosol generating device.

SUMMARY

A. Technical Problem

There is a need for an error analysis device for an aerosol generating device and a system for the same. In more detail, there is a need for a device and a system for determining an error occurred in an aerosol generating device based on log data. Meanwhile, additional problems will be set forth in part in the description which follows and, in part, will be apparent from the description, or may be learned by practice of the presented embodiments.

B. Technical Solution

An error analysis device according to an aspect of the present disclosure includes: a communication interface for receiving log data from an aerosol generating device; and a processor configured to determine at least one error that occurred in the aerosol generating device based on the received log data, wherein the log data may include logs corresponding to events occurred by the aerosol generating device.

C. Advantageous Effects

An error analysis device of an aerosol generating device, according to an embodiments of the present disclosure, analyzes log data to determine an error that occurred in the aerosol generating device, so that malfunction or failure of the aerosol generating device may be prevented.

In addition, because the priority of a plurality of errors occurred in the aerosol generating device is determined, the accuracy of error analysis is increased.

The effects of embodiments of the present disclosure are not limited to the above-described effects, and effects that are not mentioned will be clearly understood by one of ordinary skill in the art from the present specification and the accompanying drawings.

DESCRIPTION OF DRAWINGS

FIG. 7 is a view of an example of log data generated by an aerosol generating device.

FIG. 12 is a block diagram of an example of an error analysis system.

BEST MODE

Figure 1:
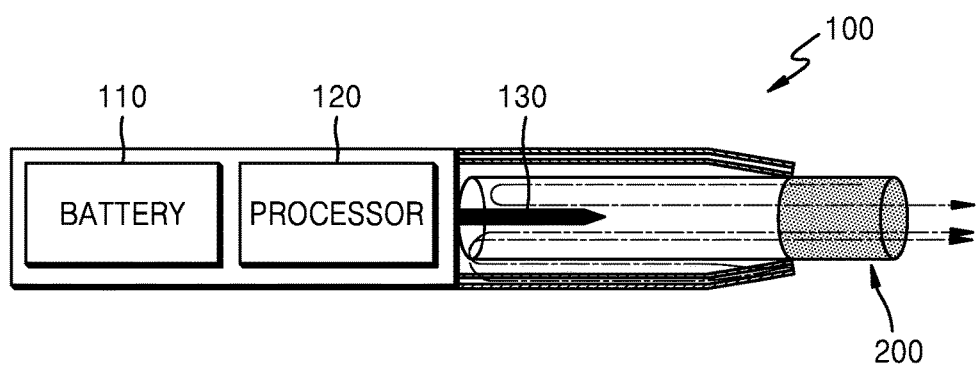
FIG. 1 is a diagram showing an example in which an aerosol generating article is inserted into an inside-heating aerosol generating device.

According to one or more embodiments, an error analysis device for an aerosol generating device is provided. The error analysis device includes: a communication interface configured to receive log data from the aerosol generating device; and a processor configured to determine at least one error that occurred in the aerosol generating device based on the log data that is received, wherein the log data includes logs corresponding to events that occurred in the aerosol generating device.

According to an embodiment, the processor is further configured determine a main error that occurred in the aerosol generating device based on error logs most often included in the log data.

According to an embodiment, the processor determines at least one sub-error, excluding the main error, based on other error logs included in the log data.

According to an embodiment, the processor is further configured to classify each of a plurality of error logs included in the log data into one of a plurality of preset categories.

According to an embodiment, the processor is further configured to determine a main error that occurred in the aerosol generating device based on a category, from among the plurality of preset categories, that includes a largest number of error logs.

According to an embodiment, the processor is further configured to determine at least one sub-error, excluding the main error, based on at least one other category, from among the plurality of preset categories, that includes the error log.

According to an embodiment, the processor is further configured to classify an error log, from among the plurality of error logs, corresponding to an overheat error of a device into a category from among the plurality of preset categories, and the overheat error of the device includes an event in which a temperature of a thermistor included in the aerosol generating device exceeds a preset temperature.

According to an embodiment, the processor is further configured to classify an error log, from among the plurality of error logs, corresponding to a quiescent current error, an error log, from among the plurality of error logs, corresponding to an over-current error of a heater included in the aerosol generating device, and an error log, from among the plurality of error logs, corresponding to an under-current error of the heater into a same category from among the plurality of preset categories, the quiescent current error includes an event in which an amount of a quiescent current flowing inside the aerosol generating device exceeds a preset threshold value of the quiescent current in a quiescent state of the aerosol generating device, the over-current error of the heater includes an event in which an amount of a heater current flowing through the heater included in the aerosol generating device exceeds a preset range of the heater current in a heating state of the aerosol generating device, and the under-current error of the heater includes an event in which the amount of the heater current flowing through the heater is less than the preset range of the heater current in the heating state of the aerosol generating device.

According to an embodiment, the processor is further configured to classify an error log, from among the plurality of error logs, corresponding to an overheat error of a heater included in the aerosol generating device and an error log, from among the plurality of error logs, corresponding to an under-temperature error into a same category from among the plurality of preset categories, the overheat error of the heater includes an event in which a temperature of the heater included in the aerosol generating device exceeds a preset temperature range of the heater in a heating state of the aerosol generating device, and the under-temperature error includes an event in which a maximum temperature of the heater included in the aerosol generating device is less than the preset temperature range of the heater in the heating state of the aerosol generating device.

According to an embodiment, the processor is further configured to classify an error log, from among the plurality of error logs, corresponding to a battery error into a category from among the plurality of preset categories, and the battery error includes an event in which an accumulated charging time of the aerosol generating device exceeds a preset maximum charging time.

According to one or more embodiments, an aerosol generating device is provided. The aerosol generating device includes: a memory; and a processor configured to record logs, corresponding to events that occurred in the aerosol generating device, in the memory, wherein the processor is further configured to determine at least one error that occurred in the aerosol generating device based on the logs recorded in the memory.

According to an embodiment, the processor is further configured to determine a main error of the aerosol generating device based on error logs recorded most often in the memory, from among the logs recorded in the memory.

According to an embodiment, the processor is further configured to: record the logs in the memory in an order of times at which the events occurred, and based on a capacity of the memory being exceeded, delete at least one of the logs recorded in the memory in an order of recording times.

According to an embodiment, the aerosol generating device further includes a display, wherein the processor is further configured to display the at least one error on the display.

According to one or more embodiments, an error analysis system is provided. The error analysis system includes: an aerosol generating device; and an error analysis device comprising a processor. The aerosol generating device includes: a memory; a communication interface configured to communicate with the error analysis device; and a processor configured to record logs, corresponding to events that occurred in the aerosol generating device, in the memory. The error analysis device is configured to: receive log data including the logs from the aerosol generating device through the communication interface, and determine at least one error that occurred in the aerosol generating device based on the log data.

DETAILED DESCRIPTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used may be selected. In such a case, the meaning of the term will be described in detail at the corresponding portion in the description of the present disclosure. Therefore, the terms used to describe the various embodiments of the present disclosure should be defined based on the meanings of the terms and the descriptions provided herein.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element is referred to as being "over," "above," "on," "below," "under," "beneath," "connected to" or "coupled to" another element, it can be directly over, above, on, below, under, beneath, connected or coupled to the other element or intervening elements may be present. In contrast, when an element is referred to as being "directly over," "directly above," "directly on," "directly below," "directly under," "directly beneath," "directly connected to" or "directly coupled to" another element, there are no intervening elements present.

In addition, unless explicitly described to the contrary, the word "comprise" and variations such as "comprises" or "comprising" will be understood to imply the inclusion of stated elements but not the exclusion of any other elements.

As used herein, terms including an ordinal number such as "first" or "second" may be used to describe various components, but the components should not be limited by the terms. The terms are used only for the purpose of distinguishing one component from other components.

Hereinafter, example embodiments of the present disclosure will now be described more fully with reference to the accompanying drawings, such that one of ordinary skill in the art may easily work the present disclosure. Embodiments of the present disclosure may, however, be embodied in many different forms and should not be construed as being limited to the example embodiments set forth herein.

FIG. 1 is a diagram showing an example in which an aerosol generating article is inserted into an inside-heating aerosol generating device.

Referring to FIG. 1, the aerosol generating device 100 may include a battery 110, a processor 120, and a heater 130. Also, an aerosol generating article 200 may be inserted into an inner space of the aerosol generating device 100.

FIG. 1 illustrates some components of the aerosol generating device 100. It will be understood by one of ordinary skill in the art related to embodiments of the present disclosure that other components may be further included in the aerosol generating device 100, in addition to the components illustrated in FIG. 1.

FIG. 1 illustrates that the battery 110, the processor 120, and the heater 130 are arranged in series. However, the internal structure of the aerosol generating device 100 is not limited to the structures illustrated in FIG. 1. In other words, according to an embodiment of the aerosol generating device 100, the battery 110, the processor 120, the heater 130, and the vaporizer 140 may be differently arranged.

When the aerosol generating article 200 is inserted into the aerosol generating device 100, the aerosol generating device 100 may operate the heater 130 to generate an aerosol. The aerosol generated by the heater 130 is delivered to a user by passing through the aerosol generating article 200.

According to an embodiment, even when the aerosol generating article 200 is not inserted into the aerosol generating device 100, the aerosol generating device 100 may heat the heater 130.

The battery 110 may supply power to be used for the aerosol generating device 100 to operate. For example, the battery 110 may supply power to heat the heater 130 or a vaporizer 140 (refer to FIG. 2), and may supply power for operating the processor 120. Also, the battery 110 may supply power for operations of a display, a sensor, a motor, etc. mounted in the aerosol generating device 100.

The processor 120 may generally control operations of the aerosol generating device 100. In detail, the processor 120 may control not only operations of the battery 110, the heater 130, but also operations of other components included in the aerosol generating device 100. Also, the processor 120 may check a state of each of the components of the aerosol generating device 100 to determine whether or not the aerosol generating device 100 is able to operate.

A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 130 may be heated by the power supplied from the battery 110. For example, when the aerosol generating article 200 is inserted into the aerosol generating device 100, the heater 130 may be located outside the aerosol generating article 200. Thus, the heater 130, by heating, may increase a temperature of an aerosol generating material in the aerosol generating article 200.

The heater 130 may include an electro-resistive heater. For example, the heater 130 may include an electrically conductive track, and the heater 130 may be heated when currents flow through the electrically conductive track. However, the heater 130 is not limited to the example described above and may include all heaters which may be heated to a desired temperature. Here, the desired temperature may be pre-set in the aerosol generating device 100 or may be set as a temperature desired by a user.

For example, the heater 130 may include a tube-type heating element, a plate-type heating element, a needle-type heating element, or a rod-type heating element, and may heat the inside or the outside of the aerosol generating article 200, according to the shape of the heating element.

Also, the aerosol generating device 100 may include a plurality of the heater 130. Here, the plurality of the heater 130 may be inserted into the aerosol generating article 200 or may be arranged outside the aerosol generating article 200. Also, some of the plurality of the heater 130 may be inserted into the aerosol generating article 200 and the others may be arranged outside the aerosol generating article 200. In addition, the shape of the heater 130 is not limited to the shapes illustrated in FIG. 1.

The aerosol generating device 100 may further include general-purpose components in addition to the battery 110, the processor 120 and the heater 130. For example, the aerosol generating device 100 may include a display capable of outputting visual information and/or a motor for outputting haptic information. Also, the aerosol generating device 100 may include at least one sensor (a puff detecting sensor, a temperature detecting sensor, an aerosol generating article insertion detecting sensor, etc.). Also, the aerosol generating device 100 may be formed as a structure where, even when the aerosol generating article 200 is inserted into the aerosol generating device 100, external air may be introduced or internal air may be discharged.

Although not illustrated in FIG. 1, the aerosol generating device 100 and an additional cradle may form together a system. For example, the cradle may be used to charge the battery 110 of the aerosol generating device 100. Alternatively, the heater 130 may be heated when the cradle and the aerosol generating device 100 are coupled to each other.

The aerosol generating article 200 may be similar to a general combustive cigarette. For example, the aerosol generating article 200 may be divided into a first portion including an aerosol generating material and a second portion including a filter, etc. Alternatively, the second portion of the aerosol generating article 200 may also include an aerosol generating material. For example, an aerosol generating material made in the form of granules or capsules may be inserted into the second portion.

The entire first portion may be inserted into the aerosol generating device 100, and the second portion may be exposed to the outside. Alternatively, only a portion of the first portion may be inserted into the aerosol generating device 100, or the entire first portion and a portion of the second portion may be inserted into the aerosol generating device 100. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 100. For example, the opening and closing and/or a size of the air passage formed in the aerosol generating device 100 may be adjusted by the user. Accordingly, the amount of smoke and a smoking impression may be adjusted by the user. As another example, the external air may flow into the aerosol generating article 200 through at least one hole formed in a surface of the aerosol generating article 200.

Figure 2:
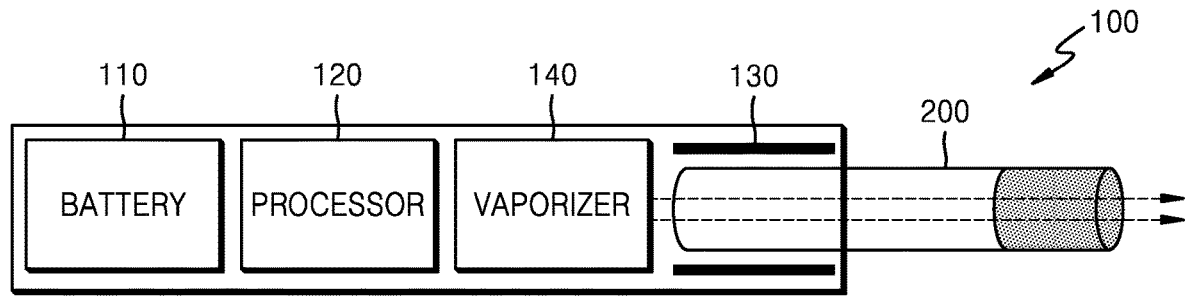
FIG. 2 is a diagram showing an example in which an aerosol generating article is inserted into an outside-heating aerosol generating device.

FIG. 2 is a diagram showing an example in which an aerosol generating article is inserted into an outside-heating aerosol generating device.

Referring to FIG. 2, the aerosol generating device 100 may further include a vaporizer 140 in addition to the components illustrated in FIG. 1. The aerosol generating article 200, the battery 110, the processor 120 and the heater 130 of FIG. 2 may correspond to the aerosol generating article 200, the battery 110, the processor 120 and the heater 130 illustrated in FIG. 1. Therefore, redundant descriptions will not be given herein.

FIG. 2 illustrates some components of the aerosol generating device 100. However, it will be understood by one of ordinary skill in the art related to embodiments of the present disclosure that other components may be further included in the aerosol generating device 100, in addition to the components illustrated in FIG. 2.

Also, FIG. 2 illustrates that the aerosol generating device 100 includes the heater 130. However, according to an embodiment, the heater 130 may be omitted.

FIG. 2 illustrates that the battery 110, the processor 120, the vaporizer 140, and the heater 130 are arranged in series.

When the aerosol generating article 200 is inserted into the aerosol generating device 100, the aerosol generating device 100 may operate the heater 130 and/or the vaporizer 140 to generate an aerosol. The aerosol generated by the heater 130 and/or the vaporizer 140 is delivered to a user by passing through the aerosol generating article 200.

The battery 110 may supply power to heat the vaporizer 140. The processor 120 may control operation of the vaporizer 140.

The vaporizer 140 may generate an aerosol by heating a liquid composition and the generated aerosol may pass through the aerosol generating article 200 to be delivered to a user. In other words, the aerosol generated via the vaporizer 140 may move along an air flow passage of the aerosol generating device 100 and the air flow passage may be configured such that the aerosol generated via the vaporizer 140 passes through the aerosol generating article 200 to be delivered to the user.

For example, the vaporizer 140 may include a liquid storage, a liquid delivery element, and a heating element, but it is not limited thereto. For example, the liquid storage, the liquid delivery element, and the heating element may be included in the aerosol generating device 100 as independent modules.

The liquid storage may store a liquid composition. For example, the liquid composition may be a liquid including a tobacco-containing material having a volatile tobacco flavor component, or a liquid including a non-tobacco material. The liquid storage may be formed to be attached/detached to/from the vaporizer 140 or may be formed integrally with the vaporizer 140.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

According to embodiments, the vaporizer 140 may be referred to as a cartomizer or an atomizer, but it is not limited thereto.

Figure 3:
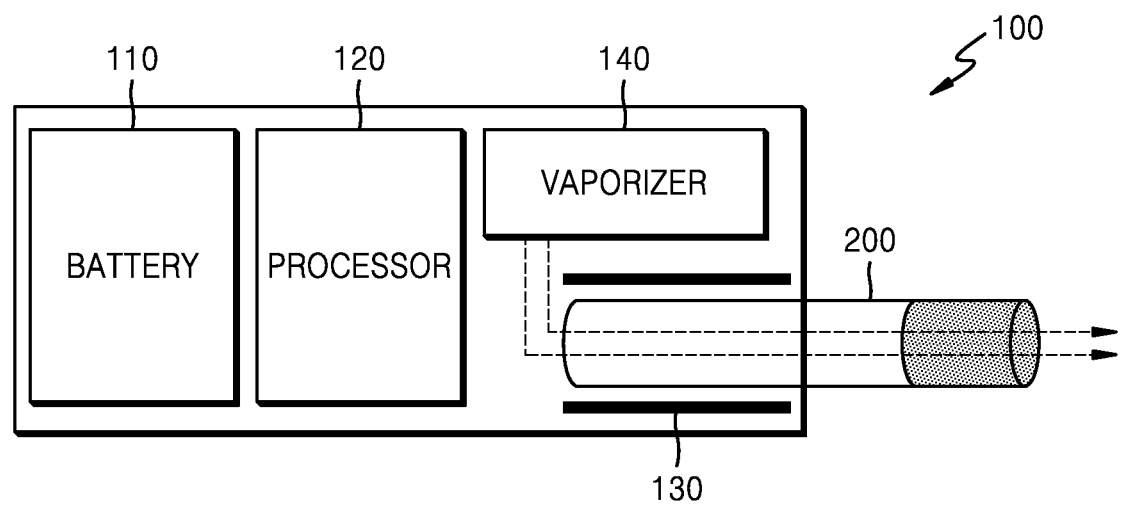
FIG. 3 is a diagram illustrating another example in which an aerosol generating article is inserted into an external heating-type aerosol generating device.

FIG. 3 is a diagram illustrating another example in which an aerosol generating article is inserted into an external heating-type aerosol generating device.

The aerosol generating article 200, the battery 110, the processor 120 and the heater 130 of FIG. 3 may correspond to the aerosol generating article 200, the battery 110, the processor 120 and the heater 130 illustrated in FIG. 2. Therefore, redundant descriptions will not be given herein.

FIG. 3 illustrates that the vaporizer 140 and the heater 130 are arranged in parallel. the vaporizer 140 and the heater 130 may be arranged in series as illustrated in FIG. 2 or may be arranged in parallel as illustrated in FIG. 3. However, the internal structure of the aerosol generating device 100 is not limited to the structures illustrated in FIGS. 2 and 3. In other words, according to the embodiment of the aerosol generating device 100, the battery 110, the processor 120, the heater 130, and the vaporizer 140 may be differently arranged.

Figure 4:
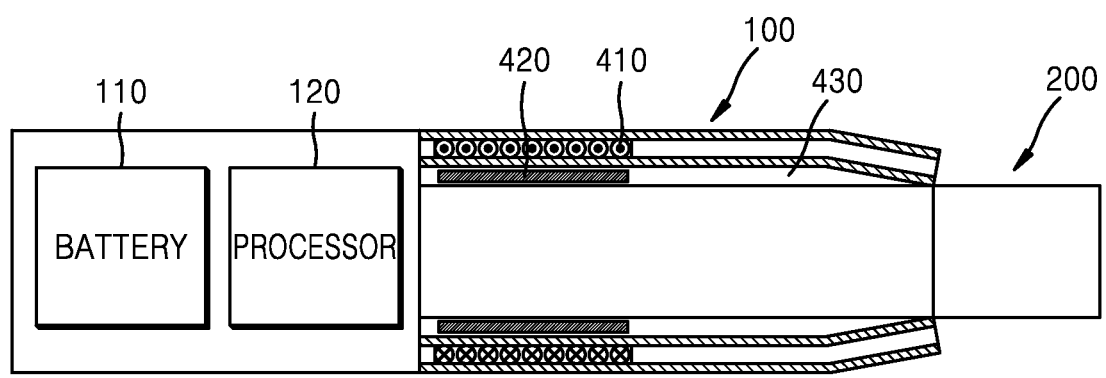
FIG. 4 is an example of an aerosol generating system using an induction heating method.

FIG. 4 is an example of an aerosol generating system using an induction heating method.

Referring to FIG. 4, an aerosol generating device 100 includes a battery 110, a processor 120, a coil 410, and a susceptor 420. A cavity 430 of the aerosol generating device 100 may accommodate at least a portion of an aerosol generating article 200. The aerosol generating article 200, the battery 110, and the processor 120 of FIG. 4 may correspond to the aerosol generating article 200, the battery 110, and the processor of FIGS. 1 through 3. Also, the coil 410 and the susceptor 420 may be included in the heater 130. Therefore, redundant descriptions will not be given herein.

FIG. 4 illustrates some components of the aerosol generating device 100. However, it will be understood by one of ordinary skill in the art related to embodiments of the present disclosure that other components may be further included in the aerosol generating device 100, in addition to the components illustrated in FIG. 4.

The coil 410 may be located around the cavity 430. FIG. 4 illustrates that the coil 410 is arranged to surround the cavity 430 but is not limited thereto.

When the aerosol generating article 200 is accommodated in the cavity 430 of the aerosol generating device 100, the aerosol generating device 100 may supply power to the coil 410 such that the coil 410 may generate a magnetic field. As the magnetic field generated by the coil 410 passes through the susceptor 420, the susceptor 420 may be heated.

Such an induction heating phenomenon is a known phenomenon that is described by Faraday's Law of induction. In detail, when magnetic induction in the susceptor 420 changes, an electric field is generated in the susceptor 420, and thus, an eddy current flows in the susceptor 420. The eddy current generates, in the susceptor 420, heat that is proportional to current density and conductor resistance.

As the susceptor 420 is heated by the eddy current and an aerosol generating material in the aerosol generating article 200 is heated by the susceptor 420 that is heated, aerosol may be generated. The aerosol generated from the aerosol generating material passes through the aerosol generating article 200 and is delivered to a user.

The battery 110 supplies power to be used for the aerosol generating device 100 to operate. The processor 120 may be electrically connected to the coil 410.

The coil 410 may be an electrically conductive coil that generates a magnetic field by power supplied from the battery 110. The coil 410 may be arranged to surround at least a portion of the cavity 430. The magnetic field generated by the coil 410 may be applied to the susceptor 420 arranged at an inner end of the cavity 430.

The susceptor 420 may be heated as the magnetic field generated from the coil 410 passes through the susceptor 420 and may include metal or carbon. For example, the susceptor 420 may include at least one of ferrite, a ferromagnetic alloy, stainless steel, and aluminum.

Also, the susceptor 420 may include at least one of graphite, molybdenum, silicon carbide, niobium, a nickel alloy, a metal film, ceramic such as zirconia, transition metal such as nickel (Ni) cobalt (Co), and metalloid such as boron (B) and phosphorus (P). However, the susceptor 420 is not limited to the examples described above and may include all susceptors that may be heated to a wanted temperature as a magnetic field is applied thereto. Here, the wanted temperature may be preset in the aerosol generating device 100 or may be set to a temperature wanted by a user.

When the aerosol generating article 200 is accommodated in the cavity 430 of the aerosol generating device 100, the susceptor 420 may be arranged to surround at least a portion of the aerosol generating article 200. Therefore, the susceptor 420 that is heated may raise a temperature of the aerosol generating material in the aerosol generating article 200.

FIG. 4 illustrates that the susceptor 420 is arranged to surround at least a portion of the aerosol generating article 200, but the arrangement of the susceptor 420 is not limited thereto. For example, the susceptor 420 may include a tube-type heating element, a plate-type heating element, a needle-type heating element, or a rod-type heating element, and may heat an inside or an outside of the aerosol generating article 200 according to a shape of a heating element.

Also, the aerosol generating device 100 may also include a plurality of the susceptor 420 arranged therein. Here, the plurality of the susceptor 420 may be arranged to be inserted into the aerosol generating article 200 or may be arranged outside the aerosol generating article 200. Also, some of the plurality of the susceptor 420 may be arranged to be inserted into the aerosol generating article 200, and the others may be arranged outside the aerosol generating article 200. In addition, the shape of the susceptor 420 is not limited to the shape illustrated in FIG. 4 and may be formed in various shapes.

FIG. 5 is a block diagram of an example of a hardware configuration of an error analysis device.

Referring to FIG. 5, an error analysis device 500 may include a communication interface 510 and a processor 520.

In the error analysis device 500 shown in FIG. 5, some components are shown. However, it is to be understood by one of ordinary skill in the art that other components may be further included in the error analysis device 500 in addition to the components shown in FIG. 5.

The error analysis device 500 may analyze errors that occur in the aerosol generating device 100. The error analysis device 500 may correspond to any one of a computer, a mobile device, and a server. However, this is only an example, and the error analysis device 500 may correspond to any electronic device capable of communicating with the aerosol generating device 100.

The communication interface 510 may receive log data from the aerosol generating device 100. For example, the communication interface 510 may be a wired communication interface. For example, the communication interface 510 may include a USB port or the like. As another example, the communication interface 510 may be a wireless communication interface. For example, the communication interface 510 may include at least one of Wi-Fi, Bluetooth, Zigbee, Wi-Fi Direct (WFD), ultra wideband (UWB), Bluetooth Low Energy (BLE), and Near Field Communication (NFC).

The processor 520 generally controls the operation of the error analysis device 500. In more detail, the processor 520 controls operations of other components included in the error analysis device 500 as well as the communication interface 510. In addition, the processor 520 may determine whether the error analysis device 500 is in an operable state by checking the states of each of the components of the error analysis device 500.

The processor 520 may determine at least one error occurred in the aerosol generating device 100 based on log data received through the communication interface 510. The log data may include logs corresponding to events that occurred in the aerosol generating device 100. Here, the events may include all operations performed by the aerosol generating device 100 in response to a user input, such as power on/off, heating start, heating completion, and smoking start of the aerosol generating device 100. In addition, events that occurred in the aerosol generating device 100 may include all errors that occurred in the aerosol generating device 100. The log data will be described later in detail with reference to FIG. 7.

The processor 520 may determine at least one error that occurred in the aerosol generating device 100 based on error logs included in the log data. Here, an error log may be a log corresponding to an event corresponding to an error from among events that occurred in the aerosol generating device 100.

In an embodiment, the processor 520 may determine at least one error that occurred in the aerosol generating device 100 based on all of the error logs included in the log data. In another embodiment, the processor 520 may determine at least one error that occurred in the aerosol generating device 100 based on error logs recorded for a certain period from among the error logs included in the log data. That is, the processor 520 may determine at least one error that occurred in the aerosol generating device 100 based on error logs corresponding to events that occurred during a certain period.

The processor 520 may determine a main error that occurred in the aerosol generating device 100 based on error logs most often included in the log data. For example, the processor 520 may determine that an error corresponding to the error logs most often included in the log data as the main error that occurred in the aerosol generating device 100. Among the error logs included in the log data, when the log data includes mostly logs corresponding to a battery error, the processor 520 may determine that the battery error is the main error of the aerosol generating device 100. The processor 520 may determine the main error as the highest priority error of the aerosol generating device 100.

The processor 520 may determine at least one sub-error excluding the main error based on the error logs included in the log data. For example, the processor 520 may determine errors corresponding to error logs, excluding the error logs most often included in the log data, as at least one sub-error. For example, among the error logs included in the log data, the errors corresponding to the error logs excluding the error logs most included in the log data may be a battery error and an overheat error of a device. In such case, the processor 520 may determine the battery error and the overheat error of the device as sub-errors.

The processor 520 may determine the priority of errors that occurred in the aerosol generating device 100 based on the number of error logs included in the log data. The processor 520 may determine the priority of errors in an order from largest to smallest number of error logs included in the log data. For example, the processor 520 may determine errors corresponding to error logs as a main error, a sub-error A, and a sub-error B in an order from largest to smallest number of error logs included in the log data. The processor 520 may determine the main error as the highest priority error of the aerosol generating device 100, the sub-error A as the second highest priority error, and the sub-error B as the third highest priority error.

Figure 5:
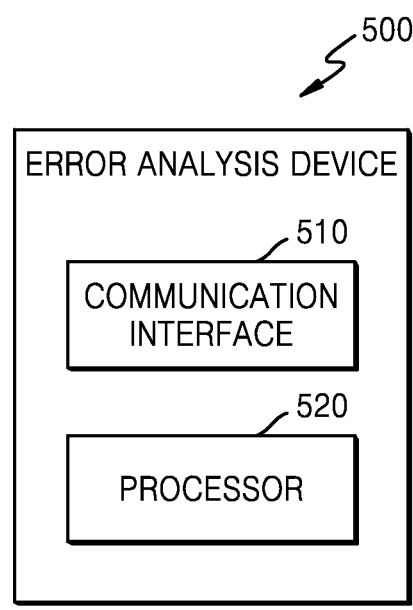
FIG. 5 is a block diagram of an example of a hardware configuration of an error analysis device.
Figure 6:
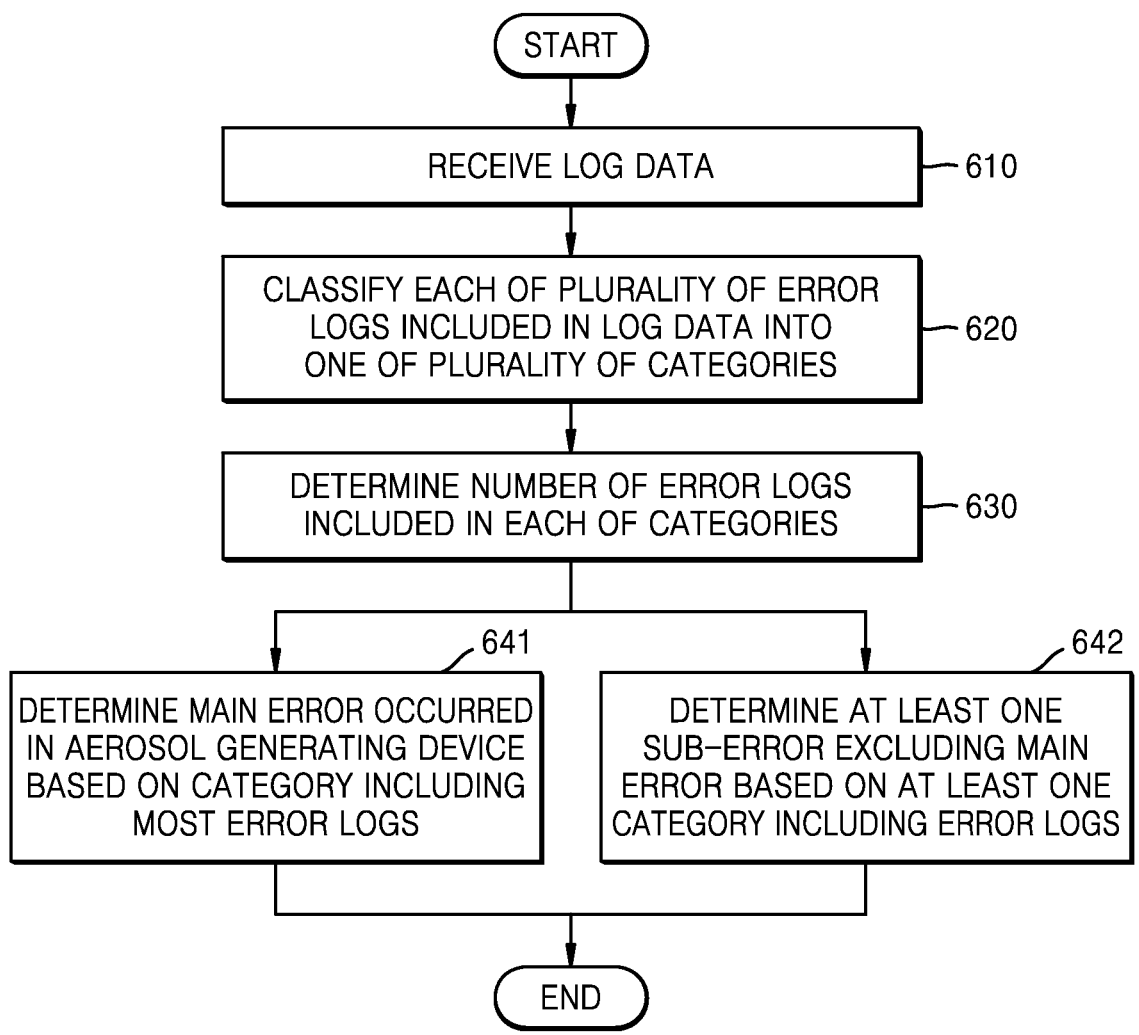
FIG. 6 is a flowchart illustrating an example of an operating method of an error analysis device according to FIG. 5.

FIG. 6 is a flowchart illustrating an example of an operating method of an error analysis device according to FIG. 5.

Referring to FIG. 6, an example of an operation method of the error analysis device 500 includes operations processed in a time series by the error analysis device 500 shown in FIG. 5.

In operation 610, the error analysis device 500 may receive log data from the aerosol generating device 100.

In operation 620, the processor 520 may classify each of a plurality of error logs included in log data into one of a plurality of categories.

The plurality of categories may be set such that errors having a common problem among errors that occurred in the aerosol generating device 100 are included in one category.

For example, the processor 520 may classify first to third error logs into a first category, fourth to sixth error logs into a second category, seventh to ninth error logs into a third category, and tenth to twelfth error logs into a fourth category. The first to twelfth error logs mean types of error logs, not each of the error logs.

An example of a plurality of categories and types of error logs included therein will be described later in detail with reference to FIGS. 7 and 8.

In operation 630, the processor 520 may determine the number of error logs included in each of the plurality of categories.

For example, when the first category includes three first error logs and two second error logs, the second category includes two fifth error logs, the third category includes one seventh error log, and the fourth category includes no error log, the processor 520 may determine the number of error logs included in the first category as 5, the number of error logs included in the second category as 2, the number of error logs included in the third category as 1, and the number of error logs included in the fourth category as 0.

In operation 641, the processor 520 may determine a main error occurred in the aerosol generating device 100 based on a category including the most error logs.

For example, when the number of logs included in the first category among the plurality of categories is the largest, the processor 520 may determine a main error occurred in the aerosol generating device 100 based on the first category. The processor 520 may determine an error corresponding to the first category as the main error.

In operation 642, the processor 520 may determine at least one sub-error excluding the main error based on at least one category including error logs.

For example, among a plurality of categories, when the number of error logs included in the first category is 5, when the number of error logs included in the second category is 2, when the number of error logs included in the third category is 1, and when the number of error logs included in the fourth category is 0, the processor 520 may determine a main error based on the first category and may determine a sub-error based on the second and third categories. The processor 520 may determine an error corresponding to the second category as the sub-error A and an error corresponding to the third category as the sub-error B.

The processor 520 may determine the priority of errors in an order from largest to smallest number of error logs included in the log data. In an embodiment, the processor 520 may determine the main error as the highest priority error, the sub-error A as the second highest priority error, and the sub-error B as the third highest priority error.

FIG. 7 is a view of an example of log data generated by an aerosol generating device.

Log data 700 may include logs corresponding to events that occurred in the aerosol generating device 100. The log data 700 may include operation logs corresponding to operations performed by the aerosol generating device 100 and error logs 710 corresponding to errors that occurred in the aerosol generating device 100. The log data 700 may include logs recorded in an order of occurrence times of events. The log data 700 may include the error logs 710 that are recorded separately from the operation logs.

In an embodiment, the log data 700 may further include error log data. The error log data may include only error logs 710 included in the log data 700, and may not include the operation logs.

A detailed method of generating the log data 700 by the aerosol generating device 100 will be described later with reference to FIG. 10.

Figure 8:
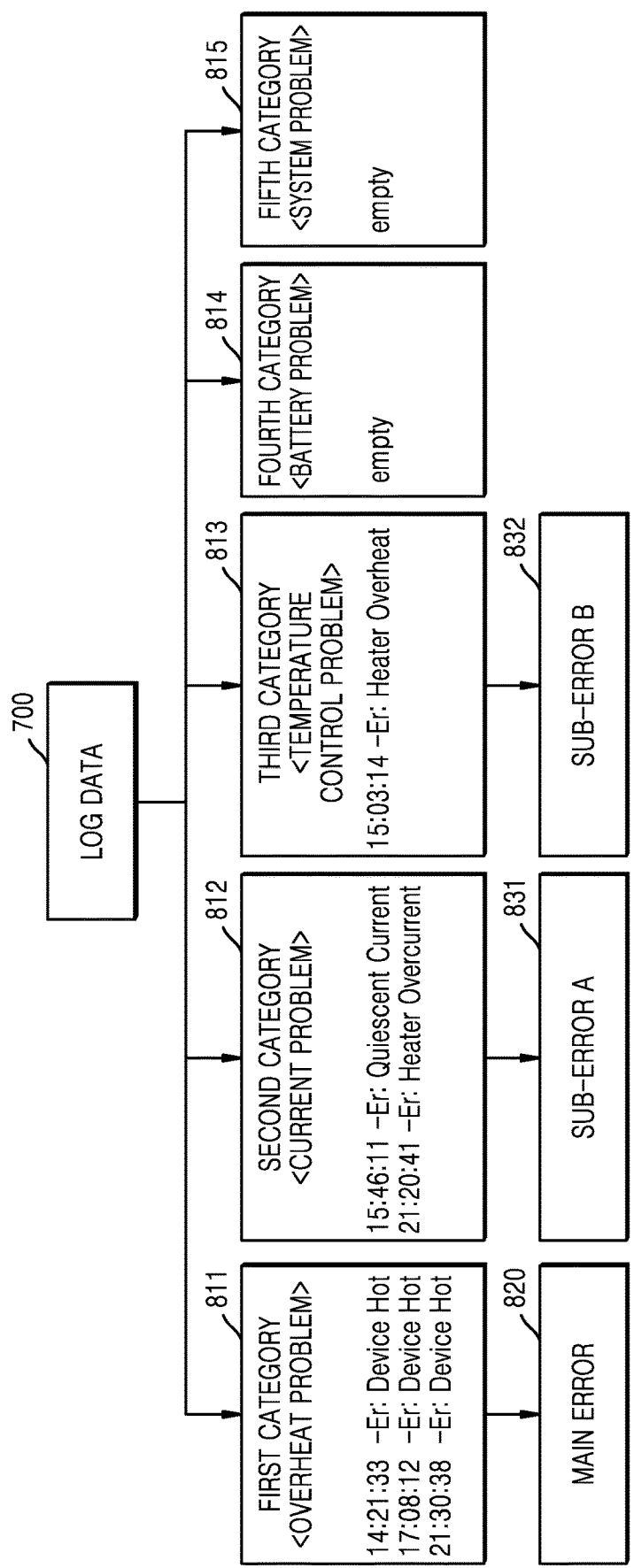
FIG. 8 is a view of an example of a method of determining at least one error based on the log data according to FIG. 7.

FIG. 8 is a view of an example of a method of determining at least one error based on the log data according to FIG. 7.

In an embodiment according to FIG. 8, the processor 520 (refer to FIG. 5) may classify each of the error logs 710 included in the log data 700 into any one of five categories. The five categories may include a first category 811 related to an overheat problem of a device, a second category 812 related to a current problem, a third category 813 related to a temperature control problem, a fourth category 814 related to a battery problem, and a fifth category 815 related to a system problem.

The processor 520 may classify the error log(s) 710 corresponding to an overheat error of a device included in the log data 700 into the first category 811. An overheat error of the device may include an event in which a temperature of a thermistor included in the aerosol generating device 100 exceeds a preset temperature. When power is supplied to the aerosol generating device 100 and the thermistor is heated to exceed the preset temperature, the error log 710 corresponding to the overheat error of the device may be recorded in the log data 700.

The thermistor may correspond to a sensor that senses a temperature of circuits or elements inside the aerosol generating device 100. A preset temperature of the thermistor may be set to a critical temperature determined to exceed an appropriate temperature of the thermistor based on a heating method of a heater, a heating temperature, and the performance of components included in the aerosol generating device 100. When the temperature of the thermistor exceeds the preset temperature, it may mean that at least one of a printed circuit board (PCB), a battery, and various elements in the aerosol generating device 100, excluding the heater, is overheated.

The processor 520 may classify the error log(s) 710 corresponding to a quiescent current error, the error log(s)

710 corresponding to an over-current error of the heater, and the error log(s) 710 corresponding to an under-current error of the heater, which are included in the log data 700, into the second category 812.

The quiescent current error may include an event in which the amount of a quiescent current flowing inside the aerosol generating device 100 exceeds a preset threshold value of the quiescent current in a quiescent state of the aerosol generating device 100. When the amount of the quiescent current flowing inside the aerosol generating device 100 in the quiescent state of the aerosol generating device 100 exceeds the preset threshold value of the quiescent current, the error log 710 corresponding to the quiescent current error may be recorded in the log data 700.

The quiescent state of the aerosol generating device 100 may correspond to a state in which the aerosol generating device 100 is not used. For example, the quiescent state of the aerosol generating device 100 may correspond to a state before the aerosol generating device 100 is used or after the use of the aerosol generating device 100 is terminated. The quiescent current may correspond to a current flowing through an integrated circuit (IC), a PCB, and a micro controller unit (MCU) inside the aerosol generating device 100 in a quiescent state. The quiescent current may be measured in the IC, the PCB, and the MCU inside the aerosol generating device 100.

The preset threshold value of the quiescent current may be set to a value determined to exceed an appropriate amount of the quiescent current based on the performance of the components included in the aerosol generating device 100 and the setting of the aerosol generating device 100.

The over-current error of the heater may include an event in which the amount of a heater current flowing through the heater included in the aerosol generating device 100 exceeds a preset range of the heater current in a heating state of the aerosol generating device 100. When the amount of the heater current exceeds the upper limit of the preset range of the heater current in the heating state of the aerosol generating device 100, the error log 710 corresponding to the over-current error of the heater may be recorded in the log data 700.

The heating state of the aerosol generating device 100 may correspond to a state in which the aerosol generating device 100 is used. For example, the heating state of the aerosol generating device 100 may correspond to a state after heating of the heater is started in response to a user input to the aerosol generating device 100 and before the use of the aerosol generating device 100 is terminated.

The preset range of the heater current may be set to include the amount of current flowing through the heater when it is determined that the heater is normally heated based on a heating method of the heater, the resistance of the heater, and the performance of the components included in the aerosol generating device 100.

The under-current error of the heater may include an event in which the amount of the heater current flowing through the heater is less than the preset range of the heater current in a heating state of the aerosol generating device 100. When the amount of the heater current is less than the lower limit of the preset range of the heater current in the heating state of the aerosol generating device 100, the error log 710 corresponding to the under-current error of the heater may be recorded in the log data 700.

The processor 520 may classify the error log(s) 710 corresponding to an overheat error of the heater included in the log data 700 and the error log(s) 710 corresponding to the under-temperature error into the third category 813.

The overheat error of the heater may include an event in which the temperature of the heater included in the aerosol generating device 100 exceeds a preset temperature range of the heater, in the heating state of the aerosol generating device 100. When the temperature of the heater exceeds the upper limit of the preset temperature range of the heater in the heating state of the aerosol generating device 100, the error log 710 corresponding to the overheat error of the heater may be recorded in the log data 700. In an embodiment, the temperature of the heater may be measured through a resistance thermometer (RTD) included in the aerosol generating device 100.

The preset temperature range of the heater may be set to a range determined as an appropriate heating temperature of the heater based on the heating method of the heater, the heating temperature, and the performance of the components included in the aerosol generating device 100.

The under-temperature error may include an event in which the maximum temperature of the heater included in the aerosol generating device 100 is less than the preset temperature range of the heater in the heating state of the aerosol generating device 100. When the maximum temperature of the heater is less than the lower limit of the preset temperature range of the heater in the heating state of the aerosol generating device 100, the error log 710 corresponding to the under-temperature error may be recorded in the log data 700.

For example, in a case where the preset temperature range of the heater is 280° C. to 320° C., when the heater is heated to 350° C., the error log 710 corresponding to the overheat error of the heater may be recorded in the log data 700. In addition, in a case where the maximum temperature of the heater in the heating state corresponds to 250° C., the error log 710 corresponding to the under-temperature error may be recorded in the log data 700. However, this is only an example, and the temperature range of the heater may be set differently according to the configuration of the aerosol generating device 100.

The processor 520 may classify the error log(s) 710 corresponding to a battery error included in the log data 700 into the fourth category 814.

The battery error may include an event in which an accumulated charging time of the aerosol generating device 100 exceeds a preset maximum charging time. When the accumulated charging time of the aerosol generating device 100 exceeds the preset maximum charging time, the error log 710 corresponding to the battery error may be recorded in the log data 700.

The preset maximum charging time may be set based on the capacity and performance of the battery included in the aerosol generating device 100 and power consumption per hour of the aerosol generating device 100. For example, the preset maximum charging time may correspond to a time required for the battery to be fully charged 500 times. However, this is only an example, and the maximum charging time of the battery may be set differently according to the configuration of the aerosol generating device 100.

The processor 520 may classify the error log(s) 710 corresponding a communication error and a control error included in the log data 700 into the fifth category 815.

The communication error may include an event in which communication between elements included in the aerosol generating device 100 fails. The control error may include an event in which the MCU included in the aerosol generating device 100 does not operate normally. The fifth category 815 related to the system problem may include various errors that may occur inside the aerosol generating device 100, other than the communication error and the control error.

The types of errors that may be included in the first to fifth categories 811 to 815 listed above are only examples and are not limited thereto. In addition to the listed errors, each category may include various other errors. In addition, the types of categories are not limited to the five listed above, and various other categories may be included.

As shown in FIG. 8, as an example, the processor 520 may classify three error logs ('-Er: Device Hot') corresponding to the overheat error of the device into the first category 811 based on the log data 700. The processor 520 may classify one error log ('-Er: Quiescent Current') corresponding to the quiescent current error and one error log ('-Er: Heater Overcurrent') corresponding to the over-current error of the heater into the second category 812 based on the log data 700. The processor 520 may classify one error log ('-Er: Heater Overheat') corresponding to the overheat error of the heater into the third category 813 based on the log data 700. The processor 520 may not include any error log 710 in the fourth category 814 and the fifth category 815 based on the log data 700.

The processor 520 may determine an error corresponding to the first category 811, that includes the largest number of error logs 710, as a main error 820 of the aerosol generating device 100. The processor 520 may determine an error corresponding to the second category 812, including the second largest number of error logs 710, as a sub-error A 831 of the aerosol generating device 100. The processor 520 may determine an error corresponding to the third category 813, that includes the third largest number of error logs 710, as a sub-error B 832 of the aerosol generating device 100. The processor 520 may determine the overheat problem of the device, which is the main error 820, as the highest priority error; the current problem, which is the sub-error A 831, as the second highest priority error; and the temperature control problem, which is the sub-error B 832, as the third highest priority error.

Figure 9:
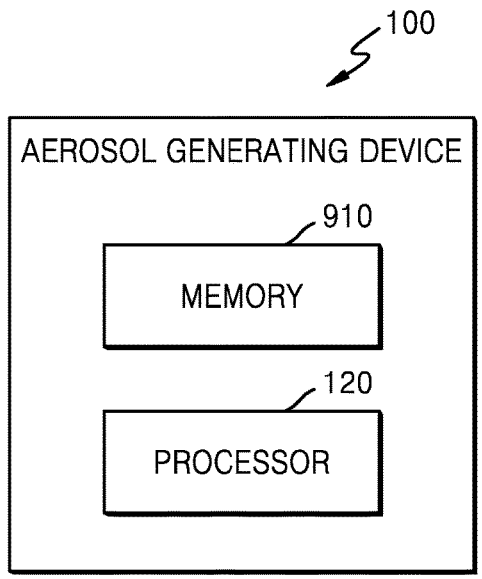
FIG. 9 is a block diagram of an example of a hardware configuration of an aerosol generating device.

FIG. 9 is a block diagram of an example of a hardware configuration of an aerosol generating device.

Referring to FIG. 9, the aerosol generating device 100 may include a memory 910 and the processor 120. The processor 120 of FIG. 9 may be the same as described with respect to FIGS. 1 to 4. Therefore, redundant descriptions will not be given herein.

In the aerosol generating device 100 shown in FIG. 9, some components are shown. However, it is to be understood by one of ordinary skill in the art that other components may be further included in the aerosol generating device 100 in addition to the components shown in FIG. 9.

The memory 910 may be a hardware component configured to store various pieces of data processed in the aerosol generating device 100, and the memory 910 may store data processed or to be processed by the processor 120. The memory 910 may include various types of memories, such as random access memory (e.g. dynamic random access memory (DRAM), static random access memory (SRAM), etc.), read-only memory (ROM), electrically erasable programmable read-only memory (EEPROM), etc.

The memory 910 may store logs corresponding to events that occurred in the aerosol generating device 100. The memory 910 may store operation logs corresponding to operations performed by the aerosol generating device 100 and error logs corresponding to errors that occurred in the aerosol generating device 100. The memory 910 may store a plurality of categories that may include error logs.

The processor 120 may record the logs corresponding to the events that occurred in the aerosol generating device 100 in the memory 910. The processor 120 may record logs in the memory 910 in the order of times at which the events occur. When the capacity of the memory 910 is exceeded, the processor 120 may delete logs recorded in the memory 910 in the order of the recording times. A detailed method for the processor 120 to record the logs to the memory 910 will be described later with reference to FIG. 10.

The processor 120 may determine at least one error occurred in the aerosol generating device 100 based on the logs recorded in the memory 910. In an embodiment, the processor 120 may determine a main error of the aerosol generating device 100 based on error logs recorded the most in the memory 910. The processor 120 may determine at least one sub-error excluding the main error based on the error logs.

In another embodiment, the processor 120 may classify each of the error logs into one of a plurality of categories stored in the memory 910. The processor 120 may determine the main error based on the category including the most error logs. The processor 120 may determine at least one sub-error excluding the main error based on at least one category including error logs.

In the method of determining at least one error occurred in the aerosol generating device 100, the processor 120 included in the aerosol generating device 100 according to FIG. 9 may operate in the same manner as the processor 520 included in the error analysis device 500 according to FIG. 5. Therefore, an operation method of the processor 120 included in the aerosol generating device 100 according to FIG. 9 may include embodiments of the processor 520 included in the error analysis device 500 described above with respect to FIGS. 5 to 8. Therefore, redundant descriptions will not be given herein.

Figure 10:
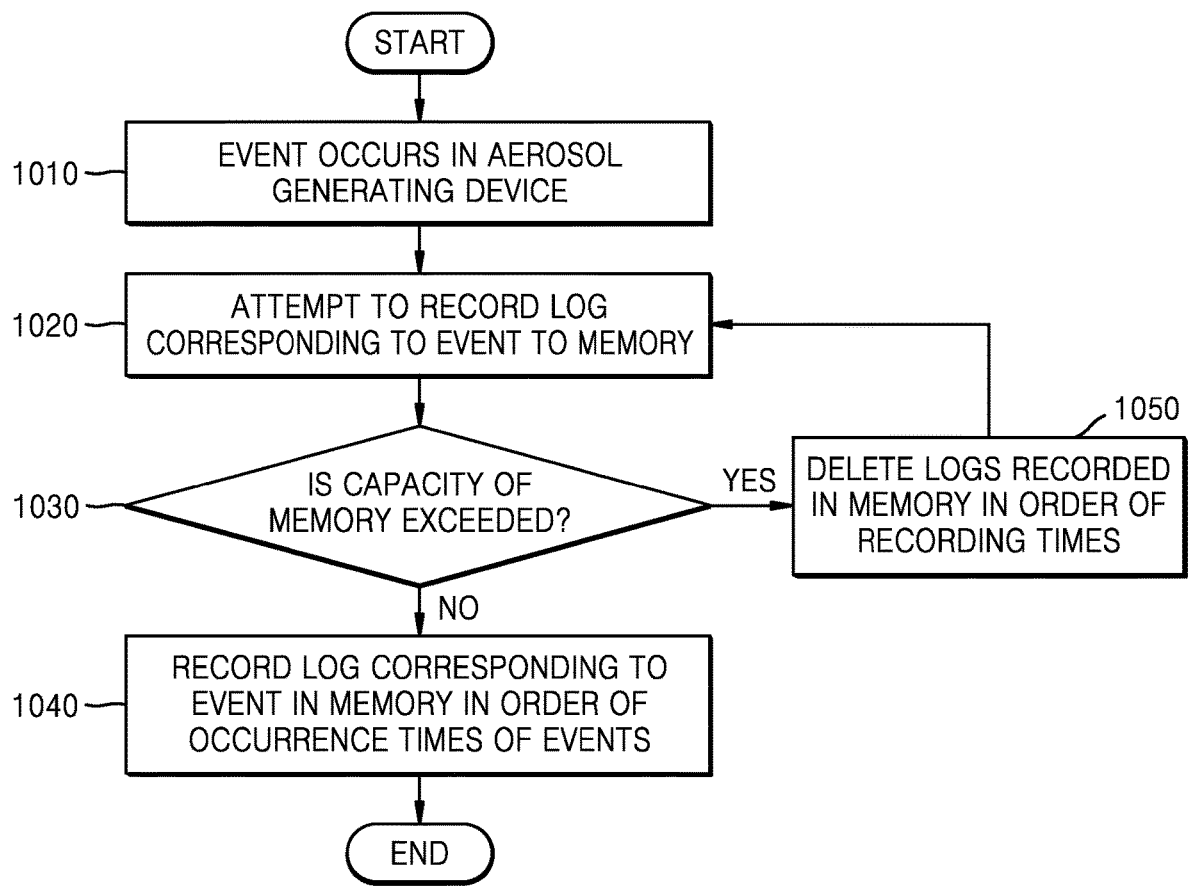
FIG. 10 is a flowchart illustrating an example of a method by which an aerosol generating device records a log in a memory.

FIG. 10 is a flowchart illustrating an example of a method by which an aerosol generating device records a log in a memory.

Referring to FIG. 10, an example of a method by which an aerosol generating device 100 records a log in a memory includes operations processed in a time series by the aerosol generating device 100 shown in FIG. 9.

In operation 1010, an event may occur in the aerosol generating device 100. The event may correspond to any operation performed by the aerosol generating device 100 and any error that occurred in the aerosol generating device 100.

In operation 1020, the processor 120 may attempt to record a log corresponding to the event to the memory 910.

In operation 1030, the processor 120 may determine whether the capacity of the memory 910 is exceeded when the log is recorded in the memory 910.

In operation 1040, when it is determined that the capacity of the memory 910 is not exceeded, the processor 120 may record the log corresponding to the event in the memory 910 in the order of times at which the events occur.

In operation 1050, when it is determined that the capacity of the memory 910 is exceeded, the processor 120 may delete logs recorded in the memory 910 in the order of the recording times. For example, the processor 120 may delete a log corresponding to the earliest event among logs recorded in the memory 910. In operation 1020 after operation 1050, the processor 120 may attempt to record a log corresponding to the event that occurred in operation 1010 in the memory 910.

Figure 11:
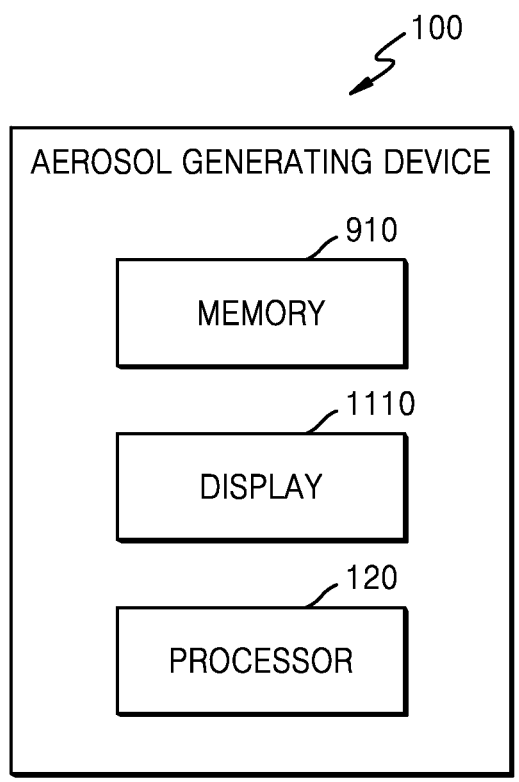
FIG. 11 is a block diagram of another example of a hardware configuration of an aerosol generating device.

FIG. 11 is a block diagram of another example of a hardware configuration of the aerosol generating device 100.

Referring to FIG. 11, the aerosol generating device 100 may include the memory 910, the processor 120, and a display 1110. The memory 910 and the processor 120 of FIG. 11 may be the same as described with respect to FIG. 9. Therefore, redundant descriptions will not be given herein.

In the aerosol generating device 100 shown in FIG. 11, some components. However, it is to be understood by one of ordinary skill in the art that other components may be further included in the aerosol generating device 100 in addition to the components shown in FIG. 11.

The processor 120 may determine at least one error occurred in the aerosol generating device 100 based on logs recorded in the memory 910. The processor 120 may display a main error and at least one sub-error on the display 1110. The processor 120 may display error logs included in each of a plurality of categories and the number thereof on the display 1110.

FIG. 12 is a block diagram of an example of an error analysis system.

Referring to FIG. 12, an error analysis system 1200 may include the aerosol generating device 100 and the error analysis device 500. The aerosol generating device 100 may include the memory 910, a communication interface 1210, and the processor 120. The memory 910 of FIG. 12 may be the same as described with respect to FIG. 9, and the processor 120 of FIG. 12 may be the same as described with respect to FIGS. 1 to 4. Therefore, redundant descriptions will not be given herein. The error analysis device 500 of FIG. 12 may be the same as described with respect to FIGS. 5 to 8. Therefore, redundant descriptions will not be given herein.

The processor 120 may record logs corresponding to events that occurred in the aerosol generating device 100 in the memory 910.

The communication interface 1210 may communicate with the error analysis device 500. The communication interface 1210 may transmit the logs recorded in the memory 910 to the error analysis device 500. The communication interface 1210 may be a wired communication interface. When the communication interface 1210 is a wired communication interface, the communication interface 1210 may directly transmit logs to the error analysis device 500 through a wire. Also, the communication interface 1210 may be a wireless communication interface. For example, the communication interface 1210 may include at least one of Wi-Fi, Bluetooth, Zigbee, WFD, UWB, BLE, and NFC.

The error analysis device 500 may analyze errors that occurred in the aerosol generating device 100. The error analysis device 500 may receive log data including logs from the aerosol generating device 100 through the communication interface 1210. The error analysis device 500 may determine at least one error that occurred in the aerosol generating device 100 based on the log data.

The descriptions of the above-described embodiments are merely examples, and it will be understood by one of ordinary skill in the art that various changes and equivalents thereof may be made.

What is claimed is:

1. An error analysis system comprising:
an aerosol generating device comprising:
a display;
at least one first memory configured to store first instructions;
a first communication interface; and
at least one first processor operatively connected to the at least one first memory, the display, and the first communication interface, the at least one first processor being configured to execute the first instructions to:
record log data comprising logs corresponding to events that occurred in the aerosol generating device, in the at least one first memory;
determine at least one error that occurred in the aerosol generating device based on the logs recorded in the at least one first memory, the at least one error comprising a quiescent current error, wherein the quiescent current error is an amount of a quiescent current flowing through the at least one first processor of the aerosol generating device exceeding a preset threshold value of the quiescent current in a quiescent state of the aerosol generating device, and the at least one error comprising a main error that occurred in the aerosol generating device; and
instruct the display to display the main error; and
an error analysis device comprising:
a second communication interface configured to receive the log data from the first communication interface of the aerosol generating device;
at least one second memory configured to store second instructions; and
at least one second processor operatively connected to the at least one second memory, the at least one second processor being configured to execute the second instructions to:
classify each of a plurality of error logs included in the log data into one of a plurality of preset categories;
determine the main error based on a category, from among the plurality of preset categories, that includes a largest number of the plurality of the error logs; and
determine the main error as a highest priority error of the aerosol generating device.

2. The error analysis system of claim 1, wherein the at least one second processor is further configured to execute the second instructions to determine at least one sub-error, excluding the main error, based on other error logs included in the log data of the plurality of the error logs.

3. The error analysis system of claim 1, wherein the at least one second processor is further configured to execute the second instructions to determine at least one sub-error, excluding the main error, based on at least one other category, from among the plurality of preset categories, that includes at least one of the plurality of the error logs.

4. The error analysis system of claim 1,
wherein the at least one second processor is further configured to execute the second instructions to classify an error log, from among the plurality of the error logs, corresponding to an overheat error of a device into a category from among the plurality of preset categories, and
wherein the overheat error of the device includes an event in which a temperature of a thermistor included in the aerosol generating device exceeds a preset temperature.

5. The error analysis system of claim 1,
wherein the at least one second processor is further configured to execute the second instructions to classify into a same category from among the plurality of preset categories:

a quiescent error log, from among the plurality of the error logs, corresponding to the quiescent current error;

an over-current error log, from among the plurality of the error logs, corresponding to an over-current error of a heater included in the aerosol generating device; and an under-current error log, from among the plurality of the error logs, corresponding to an under-current error of the heater, wherein the over-current error of the heater includes an amount of a heater current flowing through the heater included in the aerosol generating device exceeding a preset range of the heater current in a heating state of the aerosol generating device, and wherein the under-current error of the heater includes the amount of the heater current flowing through the heater being less than the preset range of the heater current in the heating state of the aerosol generating device.

6. The error analysis system of claim 1, wherein the at least one second processor is further configured to execute the second instructions to classify into a same category from among the plurality of preset categories:

an overheat error log, from among the plurality of the error logs, corresponding to an overheat error of a heater included in the aerosol generating device; and an under-temperature error log, from among the plurality of the error logs, corresponding to an under-temperature error, wherein the overheat error of the heater includes a temperature of the heater included in the aerosol generating device exceeding a preset temperature range of the heater in a heating state of the aerosol generating device, and wherein the under-temperature error includes a maximum temperature of the heater included in the aerosol generating device being less than the preset temperature range of the heater in the heating state of the aerosol generating device.

7. The error analysis system of claim 1, wherein the at least one second processor is further configured to execute the second instructions to classify a battery error log, from among the plurality of the error logs, corresponding to a battery error into a category from among the plurality of preset categories, and wherein the battery error includes an event in which an accumulated charging time of the aerosol generating device exceeds a preset maximum charging time.

8. An aerosol generating device, comprising:

a display;

at least one memory storing instructions; and at least one processor operatively connected to the at least one memory and the display, the at least one processor being configured to execute the instructions to:

record logs, corresponding to events that occurred in the aerosol generating device, in the at least one memory;

determine at least one error that occurred in the aerosol generating device based on the logs recorded in the at least one memory, the at least one error comprising a quiescent current error, wherein the quiescent current error is an amount of a quiescent current flowing through the at least one processor of the aerosol generating device exceeding a preset threshold value of the quiescent current in a quiescent state of the aerosol generating device;

classify each of a plurality of error logs included in the logs into one of a plurality of preset categories;

determine a main error that occurred in the aerosol generating device based on a category, from among the plurality of preset categories, that includes a largest number of the plurality of the error logs;

determine the main error as a highest priority error of the aerosol generating device; and instruct the display to display the main error.

9. The aerosol generating device of claim 8, wherein the at least one processor is further configured to:

record the logs in the at least one memory in an order of times at which the events occurred; and based on a capacity of the at least one memory being exceeded, delete at least one of the logs recorded in the at least one memory in an order of recording times.

* * * * *